United States Patent [19]

Schwalm et al.

[11] 3,962,853

[45] June 15, 1976

[54] METHOD OF CONVERTING AN IMPLEMENT FRAME FROM A FORWARD HARVESTING MODE TO A LATERAL TRANSPORT MODE

[75] Inventors: Bruce D. Schwalm, Leola; Bryant F. Webb, Ephrata, both of Pa.

[73] Assignee: Sperry Rand Corporation, New Holland, Pa.

[22] Filed: Mar. 29, 1974

[21] Appl. No.: 456,416

[52] U.S. Cl. .............................. 56/228; 56/DIG. 2; 280/415 R
[51] Int. Cl.² ..................................... A01D 75/22
[58] Field of Search ................. 56/228, 1, DIG. 2; 280/415 R, 415 A, 415 B; 172/240

[56] References Cited
UNITED STATES PATENTS

| | | | |
|---|---|---|---|
| 2,833,105 | 5/1958 | Naery | 56/228 |
| 3,457,709 | 7/1969 | Killbery et al. | 56/228 X |
| 3,721,461 | 3/1973 | Nelson et al. | 280/415 R |
| 3,751,891 | 8/1973 | Molzahn et al. | 56/228 |

*Primary Examiner*—J.N. Eskovitz
*Attorney, Agent, or Firm*—John R. Flanagan; Frank A. Seemar; Joseph A. Brown

[57] ABSTRACT

A pull-type crop harvesting implement has a mobile frame which may be converted from a forward harvesting mode to a lateral transport mode by utilizing a first jack to support a left forward end of the frame, pivoting a field tongue connected to the left forward frame end from a forwardly-extending position, in which it may be coupled to a tractor for towing the implement in a forward direction in its harvesting mode, to a transversely-extending fixed position, pivoting the one of two spaced-apart ground wheels which is mounted at the left rearward frame end from a forwardly-directed position to a transversely-directed position, disposing a transport tongue at the right lateral side of the frame in a fixed position extending outwardly from the right lateral frame side, supporting the right lateral frame side by utilizing a second jack, removing the other of two ground wheels which is mounted at the right rearward frame side in a forwardly-directed position and remounting the other wheel in a transversely-directed position along the transversely-extending field tongue, and then removing the support at the left forward frame end being provided by the first jack. The tractor may then be coupled to the transport tongue for towing the implement laterally or in a direction transverse to the forward direction after the support being provided by the second jack is removed.

8 Claims, 4 Drawing Figures

U.S. Patent   June 15, 1976   3,962,853
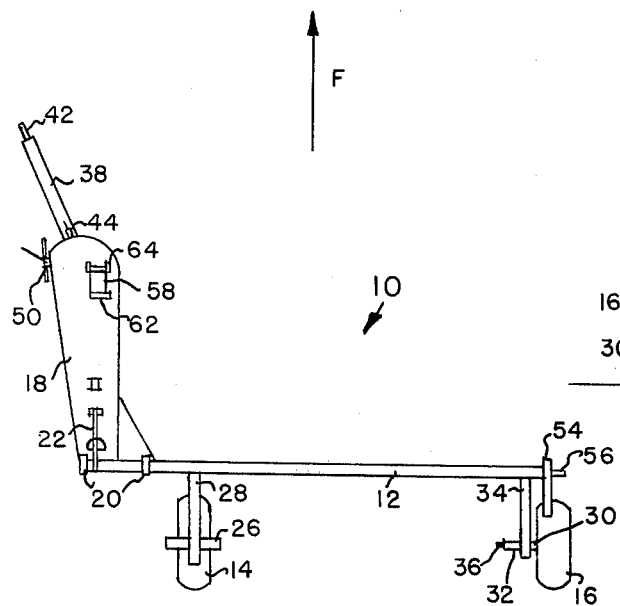
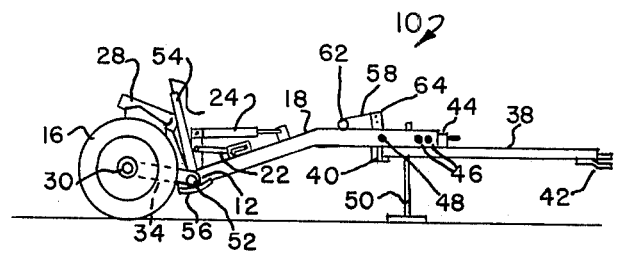
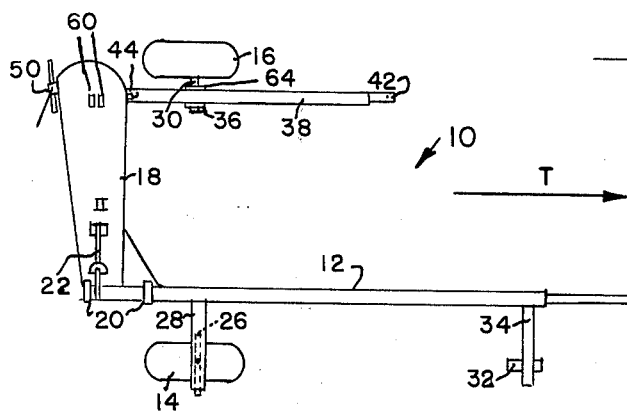

METHOD OF CONVERTING AN IMPLEMENT FRAME FROM A FORWARD HARVESTING MODE TO A LATERAL TRANSPORT MODE

BACKGROUND OF THE INVENTION

1. FIELD OF THE INVENTION

The present invention relates generally to an implement for harvesting crop material and, more particularly, is concerned with a method of converting the implement frame from a harvesting mode to a lateral transport mode.

2. DESCRIPTION OF THE PRIOR ART

A pull-type crop harvesting implement, such as a mower-conditioner, windrower, swather or the like, commonly extends 12 or more feet in width, that being the dimension of the implement which extends transverse to the forward direction of implement movement across a field, in order that the implement may be capable of harvesting as wide a swath of crop material as parctical during each pass across the field. However, an implement having a transverse width within the aforementioned range presents difficulties when it is desired to transport the implement along public or other roads, over narrow bridges and through field gates between harvesting operations.

Various methods have been employed in the prior art to overcome these difficulties. One method has been to convert the implement from its normal forward harvesting mode to a transport mode in which the implement may be towed by a tractor or other vehicle from one of its lateral sides such that the aforementioned transverse width of the implement will now extend generally parallel to the direction of transport movement, instead of transversely thereto.

In order to accomplish such conversion, one general approach is to provide an additional ground wheel or wheels which are primarily intended for use when the implement is set up in its transport mode, such approach being disclosed in U.S. Pat. Nos. 2,833,105, 3,457,709 and 3,751,891.

While the aforementioned approach of the cited patents appears to satisfactorily avoid the difficulties associated with forward transporting of the implement, other disadvantages are presented. Specifically, it is believed that utilization of an additional wheel or wheels inordinately increases the overall implement cost and requires additional expenses and operator time in rendering subsequent repair and maintenance services for the additional wheel or wheels.

SUMMARY OF THE INVENTION

The conversion method of the present invention avoids the aforementioned disadvantages by providing only two ground wheels for the implement with both wheels being as equally useful and necessary when the implement is set up in its forward harvesting mode as when set up in its lateral transport mode. Furthermore, the conversion method may be accomplished with relative ease, in an extremely short period of time, such as approximately five minutes, by a single individual utilizing only his hands and with the assistance of only a few additional, and relatively inexpensive, parts which will ordinarily not require subsequent maintenance or repair.

Accordingly, the present invention relates to a method of converting a mobile implement frame from a harvesting mode, wherein the frame may be moved in a forward direction across a field, to a lateral transport mode, wherein the frame may be moved in a direction transverse to the forward direction.

First, the forward end of the frame adjacent one lateral side thereof is supported at a predetermined elevated position above the field. A field tongue, being pivotally connected to the forward frame end is moved from a forwardly-extending position in which the tongue may be coupled to a vehicle for towing the frame in its harvesting mode, to a fixed position extending transversely to the forwardly-extending position.

Next, one of a pair of rotatable ground wheels, which mountably supports and is pivotally connected about a vertical axis to the rearward frame end adjacent the one lateral frame side, is pivotally moved from a forwardly-directed position in which the one wheel movably supports the frame in the harvesting mode to a position directed transversely to the forwardly-directed position.

Following next, a transport tongue is positioned in a fixed relationship to the frame extending laterally outwardly from an opposite other lateral side of the frame for coupling the frame at its other lateral side to the towing vehicle and support is provided for the other lateral frame side at a predetermined elevated position above the field.

Finally, the other of the pair of rotatable ground wheels is removed from a forwardly-directed position located at the rearward frame end adjacent the opposite lateral frame side and transferred to, and mounted at, a location along the field tongue adjacent to the one lateral frame side and in a position directed transversely to its former forwardly-directed position. The support being provided for the forward frame end is removed once the other ground wheel has been mounted to the field tongue.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 1 is a plan view of a mobile frame for a pull-type crop harvesting implement being set up for field harvesting operation and capable of being converted between its forward harvesting mode and a lateral transport mode according to the principles of the present invention;

FIG. 2 is a right side elevational view of FIG. 1;

FIG. 3 is a plan view of the frame of FIG. 1, showing the frame set up in its lateral transport mode; and FIG. 4 is a right side elevational view of FIG. 3.

DETAILED DESCRIPTION OF THE INVENTION

In the following detailed description right and left hand references are determined by standing to the rear of the implement frame and facing in the direction of its forward travel across a field. Also, in the following description, it is to be understood that such terms as "forward," "rearward," "left," etc., are words of convenience and are not to be construed as limiting terms.

BASIC COMPONENTS OF THE IMPLEMENT

Referring now to FIGS. 1 and 2, there is shown a mobile, L-shaped frame, indicated generally by numeral 10, for a pull-type crop harvesting implement, such as a mower-conditioner, windrower, swather or the like, with the frame 10 being set up in its normal harvesting mode for movement across a field in the performance of harvesting operations by the implement.

The frame 10 includes a main pipe frame member 12 which is movably supported on a pair of spaced apart left and right rear ground wheels 14, 16 and extends in a transverse relationship to the direction F of forward travel of the implement across the field during the performance of harvesting operations. The frame 10 also includes a hitch frame member 18 which is pivotally mounted at its rearward end by spaced apart clamps 20 to the left end of the main frame member 12, is maintained in a desired angular position with respect to the main frame member 12 by linkage 22 and a hydraulic cylinder 24 (the hydraulic cylinder being omitted for purposes of clarity in FIGS. 1 and 3) both interconnecting the pipe and hitch frame members 12, 18, and extends forwardly therefrom in a generally parallel relationship to the direction F.

A header (not shown) having operative harvesting components generally known in the art is adapted to be supported from the main frame member 12 so as to be disposed forwardly thereof and adjacent to and along the hitch frame member 18. When the hitch frame member 18 of the frame 10 is coupled to a towing vehicle in a manner described hereinafter and the hydraulic cylinder 24 is either extended or contacted, the header being mounted to the main frame member 12 will respectively either be raised or lowered with respect to the field.

The left rear ground wheel 14 is rotatably mounted between the opposite lower ends of an inverted U-shaped swivel bracket 26 which is pivotally journalled about a vertical axis at its upper end to an angled support arm 28 being fixed at its lower end to the pipe frame member 12 and extending generally upwardly and rearwardly therefrom. The swivel bracket 26 may be selectively locked to the support arm 28 by suitable means, such as a latch pin received through aligned holes defined respectively in bracket 26 and arm 28 (not shown), in either a first orientation generally parallel to the pipe frame member 12, as shown in FIG. 1, to position the wheel 14 for movement in the direction F of implement travel in the forward harvesting mode, or a second orientation generally perpendicular to the pipe frame member 12, as shown in FIG. 3, to position the wheel 14 for movement in the direction T of implement travel in the lateral transport mode.

An axle 30 rotatably journalled to the right rear ground wheel 16 is received through, and, mountably fixed to, a spindle 32 which extends generally parallel to the pipe frame member 12 and is fixed to the outer end of a rearwardly-extending support arm 34 being fixed to and extending rearwardly from the pipe frame member 12. Fastening means 36 received on the outer end of the axle 30, such as a removable cotter pin (not shown), secures the axle 30 to the spindle 32 and may be unfastened from the end of the axle 30 when it is desired to remove the wheel 16 and its axle 30 from the support arm 34 in converting the frame 10 from its harvesting mode to its transport mode as will be described hereinafter.

In order to pull the mobile frame 10 in its harvesting mode forwardly in direction F across the field during the performance of harvesting operations, a field tongue 38 is pivotally connected about a vertical axis at 40 to the forward end of the hitch frame member 18, extends forwardly therefrom, and has a clevis 42 fixedly mounted as its forward end for coupling the mobile frame 10 to a towing tractor. The field tongue 38 is pivotally moveable between, and may be latched and held by suitable retention means 44 at any one of, a variety of positions 46 about the curved forward end of the hitch frame member 18 for towing the frame 10 forwardly in its harvesting mode. In FIGS. 1 and 2, the field tongue 38 is illustrated at one of the variety of aforementioned positions. Also, the field tongue 38 may be pivoted clockwise from its position of FIG. 1 to the position illustrated in FIG. 3, such position being indicated at 48 in FIG. 2, and latched and held at the latter position, in converting the frame 10 from its forward harvesting mode to its lateral transport mode. In such latter position, the field tongue 38 extends in a transverse relationship to direction F and in a generally parallel relationship to the main pipe frame member 12. A hitch frame jack 50 is clamped on the outboard side of the forward end of the hitch frame member 18 by suitable adjustable bracket means (not shown) and is normally utilized along with the ground wheels 14, 16 to support the frame 10 above the field and in a generally parallel relationship thereto when the implement is uncoupled from the towing vehicle, as clearly illustrated in FIG. 2. Also, as will be described hereinafter, the hitch frame jack 48 plays an important role in carrying out the steps involved in converting the frame 10 between its harvesting mode and its lateral transport mode.

ADDITIONAL COMPONENTS FOR CONVERTING IMPLEMENT BETWEEN HARVESTING AND TRANSPORT MODES

As stated hereinbefore, a principal advantage of the conversion method comprising the present invention is that it utilizes only the two ground wheels 14, 16 which normally support the frame 10 in its harvesting mode to provide the support for the frame 10 in its lateral transport mode. The rearrangement of the two ground wheels 14, 16 in carrying out the steps of the conversion method is accomplished with the assistance of only a few additional parts which, although not used in the harvesting mode of the frame, are maintenance-free and relatively inexpensive in comparison with those additional parts correspondingly so required in the conversion methods disclosed in the prior art.

The first of these additional parts which facilitates the conversion of the frame 10 between its harvesting and lateral transport modes is a transport tongue 52 which is normally telescopically carried within the main pipe frame member 12, as shown clearly in FIG. 1, and which may be slideably extended relative thereto, when needed, to the position shown clearly in FIG. 3 and locked in such position by suitable means (not shown), such as a fastening means inserted through complementary aligned holes formed both in the top and bottom of the transport tongue 52 and the right end portion of the pipe frame member 12.

Another of these additional parts which contributes to the ease of performance of the conversion method is a transport tongue jack 54 which is mounted by suitable adjustable bracket means (not shown) to the outer end portion of the transport tongue 52 adjacent to a clevis 56 fixedly mounted thereon for coupling the mobile frame 10 when in its transport mode to a towing tractor. However, jack 54 could also be mounted on the right end portion of the pipe frame member 12 or on the support arm 34, since at any of these mounting positions the jack 54 may be actuated to support the right side of the frame 10.

The final one of the additional parts which accommodates the rearrangement of the right rear ground wheel 16 during conversion of the frame 10 from its field position of FIGS. 1 and 2 to its transport position of FIGS. 3 and 4 is a removable wheel support 58 normally fastened, when not being used, to upright tabs 60 being fixed on the top surface of the hitch frame member 18. The wheel support 58 has a spindle 62 being fixed to one end thereof and adapted to receive the axle 30 of the right rear ground wheel 16, and a U-shaped channel part 64 formed at the opposite end of the support 58 which is dimensioned to snugly fit about the bottom and sides of the field tongue 38 at a position therealong spaced from location 40, as shown in FIG. 3, at which it is adapted to be fastened thereto by a suitable fastening means, such as a pair of cylindrical coupling pins received through aligned holes respectively defined in the channel part 64 and the field tongue 38 and held in place by hairpin cotter pins (not shown), to align the wheel 16 with the left rear wheel 14.

THE CONVERSION OPERATION

The frame 10 may be converted from its harvesting mode, as shown in FIGS. 1 and 2, to its lateral transport mode, as shown in FIGS. 3 and 4, by performance of the steps described hereinafter.

First, the hitch frame jack 50 is lowered to the field and actuated so as to support the weight of the forward end of the frame 10 (which includes the header which is not shown) and thereby relieve the field tongue 38 from supporting the frame weight which it does when coupled to the towing vehicle.

Next, either the field tongue 38 may be uncoupled from the towing vehicle, its retention means 44 unlatched and then tongue 38 pivoted clockwise approximately 90° from its position of FIG. 1 generally parallel to direction F to the position of FIG. 3 parallel to the pipe frame member 12 and finally its retention means 44 latched at the latter position, or the left rear ground wheel 14 may be unlocked from its forwardy-directed position of FIG. 1 and swivelled or pivoted approximately 90° to the transversely-directed position of FIG. 3 and locked in the latter position. Regardless of which step is performed first, these steps should be performed consecutively, one after the other.

Following next, the transport tongue 52 is telescopically extended from the pipe frame member 12 and fixed at the extended position shown in FIG. 3 and the transport tongue jack 54 being mounted to the outer end portion of tongue 52 is then lowered to the field and actuated so as to support the weight of the right lateral side of the frame 10. Of course, if the jack 54 is mounted to the right end of the pipe frame member 12, instead of to the tongue 52, then the jack 54 could be lowered to support the frame 10 before the tongue 52 is extended.

With the jack 54 so supporting the right lateral frame side, the right rear ground wheel 16, now being relieved of the frame weight, may be transferred from its forwardly-directed position located at the right rearward end of the pipe frame member 12 to a transversely-directed position located along the field tongue 38 as illustrated in FIG. 3. In order to effect the transfer of wheel 16, the wheel support 58 is unfastened from tabs 60 and mounted at the desired location along the field tongue 38, which location is generally aligned with the location of wheel 14. Then the right rear ground wheel 16 is unfastened from the spindle 32 of the support arm 34, moved to the location of the wheel support 58 and rotatably coupled to the wheel support 58 by fitting axle 30 of wheel 16 through spindle 62 of the wheel support 58 and fastening the axle 30 to the spindle 62.

After the wheel 16 is so mounted along the field tongue 38, the hitch frame jack 50 may be raised such that wheel 16 now supports the weight of the forward end of frame 10.

By reversing the order of performance of the above steps, the frame 10 may be converted back from its transport mode to its harvesting mode.

It is thought that the invention and many of its attendant advantages will be understood from the foregoing description and it will be apparent that various changes may be made in the steps of the method described and their order of accomplishment without departing from the spirit and scope of the invention or sacrificing all of its material advantages, the form hereinbefore described being merely a preferred or exemplary embodiment thereof.

Having thus described the invention, what is claimed is:

1. A method of converting a mobile frame of a pull-type crop harvesting implement from a forward harvesting mode to a lateral transport mode, comprising the steps of:
   supporting said frame at a left forward end thereof at a predetermined elevated position above a field;
   pivoting a field tongue connected to said left forward frame end from a fowardly-extending position, in which said tongue may be coupled to a tractor or the like for towing said implement in a forward direction in its harvesting mode, toward a right lateral side of said frame to a transversely-extending fixed position with said frame being stationarily-positioned during said pivoting of said field tongue;
   pivoting one of two rotatably spaced-apart ground wheels, which is mounted to and supports said frame at a left rearward end thereof, from a forwardly-directed position to a transversely-directed position;
   disposing a transport tongue at said right lateral side of said frame in a fixed position extending outwardly from said right lateral frame side;
   supporting said frame at said right lateral side thereof at a predetermined elevated position above the field;
   removing the other of said two ground wheels which is mounted in a forwardly-directed position and supports said frame at a right rearward side thereof;
   remounting said other wheel in a transversely-directed position along said transversely-extending field tongue; and removing said support from said left forward frame end.

2. A method as recited in claim 1, wherein said remounting step includes the steps of:
mounting a wheel support on said field tongue at a desired location therealong; and
then rotatably coupling said other wheel in said transversely-directed position to said wheel support.

3. A method as recited in claim 1, wherein:
said first supporting step is performed by lowering a jack being adjustably mounted to said forward frame end into contact with the field; and
said final removing step is performed by raising said jack out of contact with the field.

4. A method as recited in claim 1, wherein:
said first supporting step is performed by lowering a jack being adjustably mounted to said forward frame end into contact with the field; and
said final removing step is performed by raising said jack out of contact with the field.

5. A method as recited in claim 1, wherein said second supporting step is performed by lowering a jack being adjustably mounted to said transport tongue into contact with the field.

6. A method of converting a mobile frame of a pull-type crop harvesting implement from a harvesting mode, wherein said frame may be moved in a forward direction across a field, to a lateral transport mode, wherein said frame may be moved in a direction transverse to said forward direction, comprising the steps of:
supporting said frame at a forward end thereof adjacent on lateral side thereof at a predetermined elevated position above the field;
moving a field tongue, being pivotally connected about a vertical axis at said forward frame end adjacent said one lateral frame side, from a forwardly-extending position, wherein said field tongue may be coupled to a tractor or the like for towing said frame in its harvesting mode, toward an opposite other lateral side of said frame to a fixed position extending transverse to said forwardly-extending position with said frame being stationarily-positioned during said pivoting of said field tongue;
moving one of a pair of rotatable ground wheels, which one ground wheel mountably supports, and is pivotally connected about a vertical axis to, said frame at its rearward end adjacent its one lateral side, from a forwardly-directed position, wherein said one wheel movably supports said frame in its harvesting mode, to a position directed transversely to said forwardly-directed position;
positioning a transport tongue in a fixed relationship to said frame extending laterally outwardly from said opposite other lateral side of said frame adjacent said rearward frame end for coupling said frame at said other lateral side thereof to said tractor or the like;
supporting said frame at said opposite other lateral side thereof at a predetermined elevated position above the field;
transferring the other of said pair of rotatable ground wheels from a forwardly-directed position located at said rearward frame end adjacent said opposite other lateral frame side, wherein said other wheel, along with said one wheel when in its corresponding, forwardly-directed position, also movable supports said frame in its harvesting mode, to a location along said field tongue adjacent to said one lateral frame side and in a position directed transversely to said forwardly-directed position, wherein said other wheel is rotatably coupled to said field tongue and mountably supports said frame at its forward end adjacent its one lateral side; and
removing said support from said forward end of said frame adjacent its one lateral side.

7. A method as recited in claim 6, wherein said transferring steps includes the steps of:
mounting a wheel support on said field tongue at said location along said field tongue; and
then rotatably coupling said other ground wheel in said transversely-directed position to said wheel support.

8. A method as recited in claim 3, wherein said second supporting step is performed by lowering a jack being adjustably mounted to said transport tongue into contact with the field.

\* \* \* \* \*